(12) United States Patent
Kaplan et al.

(10) Patent No.: US 10,637,108 B1
(45) Date of Patent: Apr. 28, 2020

(54) APPARATUS FOR DETECTING EXPANSION OF AN ENERGY STORAGE DEVICE CASE

(71) Applicant: Cornell Dubilier Marketing, Inc., Liberty, SC (US)

(72) Inventors: James Peter Kaplan, Pickens, SC (US); Adam William Russell, Westminster, SC (US)

(73) Assignee: Cornell Dubilier Marketing, Inc., Liberty, SC (US)

( * ) Notice: Subject to any disclaimer, the term of this patent is extended or adjusted under 35 U.S.C. 154(b) by 209 days.

(21) Appl. No.: 15/374,223

(22) Filed: Dec. 9, 2016

(51) Int. Cl.
| | |
|---|---|
| *H01M 10/48* | (2006.01) |
| *H01M 10/42* | (2006.01) |
| *H01M 6/50* | (2006.01) |
| *H01M 2/34* | (2006.01) |
| *H01G 9/08* | (2006.01) |
| *H01G 9/26* | (2006.01) |
| *H01G 9/008* | (2006.01) |

(52) U.S. Cl.
CPC .......... *H01M 10/482* (2013.01); *H01G 9/008* (2013.01); *H01G 9/08* (2013.01); *H01G 9/26* (2013.01); *H01M 2/345* (2013.01); *H01M 6/5044* (2013.01); *H01M 10/425* (2013.01); *H01M 10/4235* (2013.01); *H01M 2010/4278* (2013.01); *H01M 2200/20* (2013.01)

(58) Field of Classification Search
CPC ............ H01G 2/14; H01G 9/008; H01G 9/08; H01G 9/26; H01M 10/482; H01M 10/4235; H01M 10/425; H01M 2/345
See application file for complete search history.

(56) References Cited

U.S. PATENT DOCUMENTS

| | | | |
|---|---|---|---|
| 3,546,944 A | 12/1970 | Mack | |
| 3,657,602 A | 4/1972 | Boehm et al. | |
| 4,106,068 A * | 8/1978 | Flanagan | H01G 2/14 361/15 |
| 4,112,474 A | 9/1978 | Wilson et al. | |
| 4,330,777 A | 5/1982 | McDuff | |
| 4,577,257 A | 3/1986 | Erhardt et al. | |
| 4,633,365 A | 12/1986 | Stockman | |
| 4,698,725 A | 10/1987 | MacDougall et al. | |

(Continued)

FOREIGN PATENT DOCUMENTS

| | | |
|---|---|---|
| CN | 204905042 U | 12/2015 |
| DE | 2402501 A1 | 7/1975 |

(Continued)

OTHER PUBLICATIONS

Capacitors Age and Capacitors Have an End of Life. Emerson Network Power. WP-SL-24630. Figure 3B.

*Primary Examiner* — Jimmy Vo
(74) *Attorney, Agent, or Firm* — Timothy J. Monahan; Monahan & Company, LLC

(57) ABSTRACT

An energy storage device, such as a capacitor or battery, is provided with a detector and detector support for signaling an expansion of the case caused by a buildup of internal pressure, wherein the detector support is provided with a base attached to a periphery of a side of the case, and the detector support has a superstructure for positioning the detector over an interior of the side of the case, whereby the interior expands a greater distance than the periphery of the side of the case in response to internal pressure.

20 Claims, 8 Drawing Sheets

(56) References Cited

U.S. PATENT DOCUMENTS

| | | | |
|---|---|---|---|
| 4,837,660 A * | 6/1989 | Theoleyre | H01G 2/14 361/275.2 |
| 4,869,197 A | 9/1989 | Gupta et al. | |
| 6,106,969 A | 8/2000 | Lian et al. | |
| 6,532,824 B1 | 3/2003 | Ueno et al. | |
| 7,511,456 B2 | 3/2009 | Lee et al. | |
| 7,545,119 B1 | 6/2009 | Egan et al. | |
| 7,595,128 B2 | 9/2009 | Lee et al. | |
| 7,826,189 B1 | 11/2010 | Edwards | |
| 7,830,125 B2 | 11/2010 | Ibrahim | |
| 8,090,548 B2 | 1/2012 | Abdennadher et al. | |
| 8,717,186 B2 | 5/2014 | Zhou | |
| 9,147,872 B2 | 9/2015 | Lim et al. | |
| 9,219,260 B2 | 12/2015 | Lee et al. | |
| 2008/0157783 A1 | 7/2008 | Savary et al. | |
| 2013/0050878 A1* | 2/2013 | Perez | H01G 2/14 361/15 |
| 2013/0337297 A1 | 12/2013 | Lee et al. | |
| 2016/0064780 A1 | 3/2016 | Jarvis et al. | |

FOREIGN PATENT DOCUMENTS

| | | |
|---|---|---|
| JP | 2111565 | 5/1990 |
| JP | 2002056756 A | 2/2002 |
| WO | 8707780 A1 | 12/1967 |
| WO | 1991015742 A3 | 10/1991 |

* cited by examiner

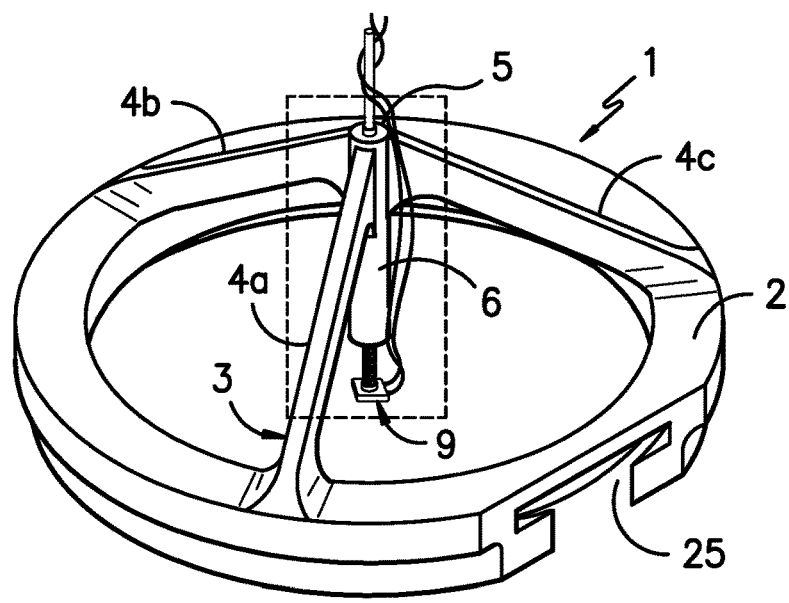
FIG. -1-
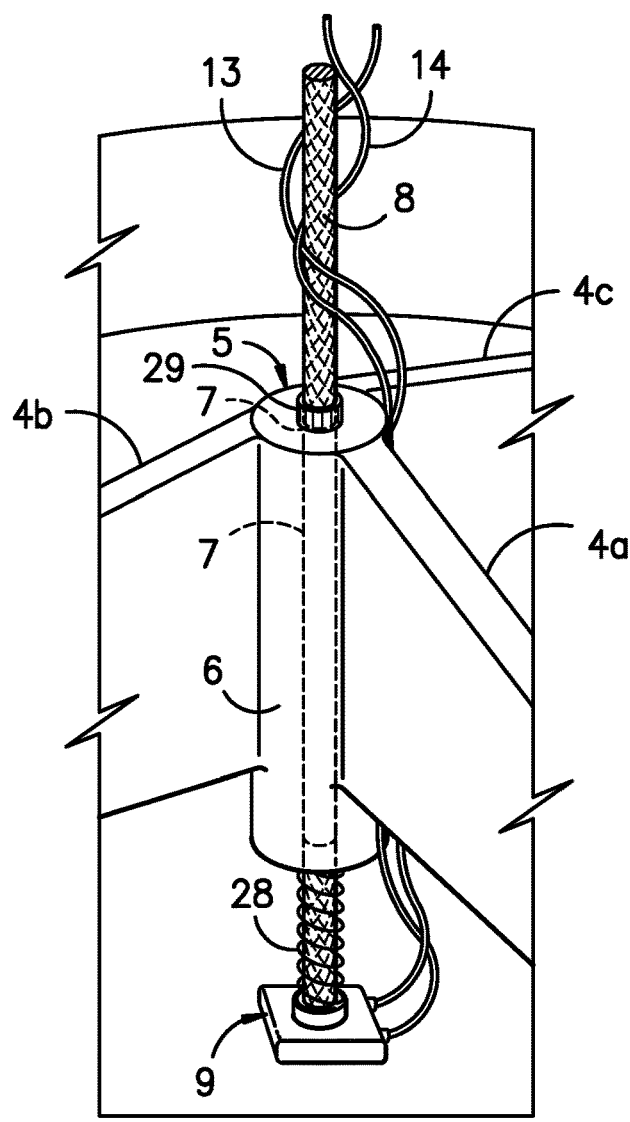
FIG. -2-

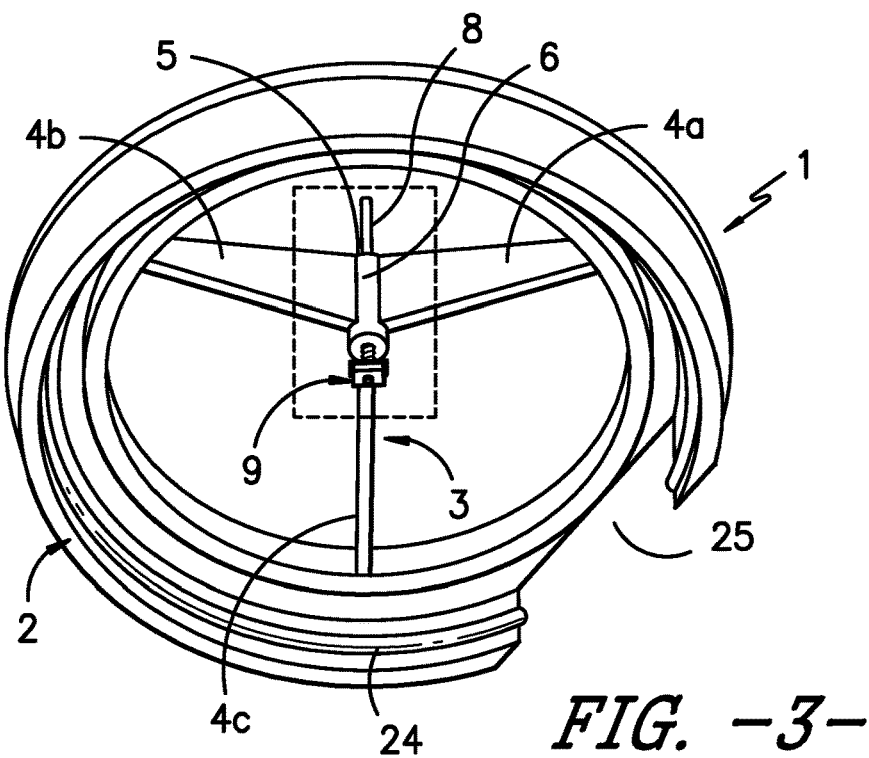
FIG. -3-
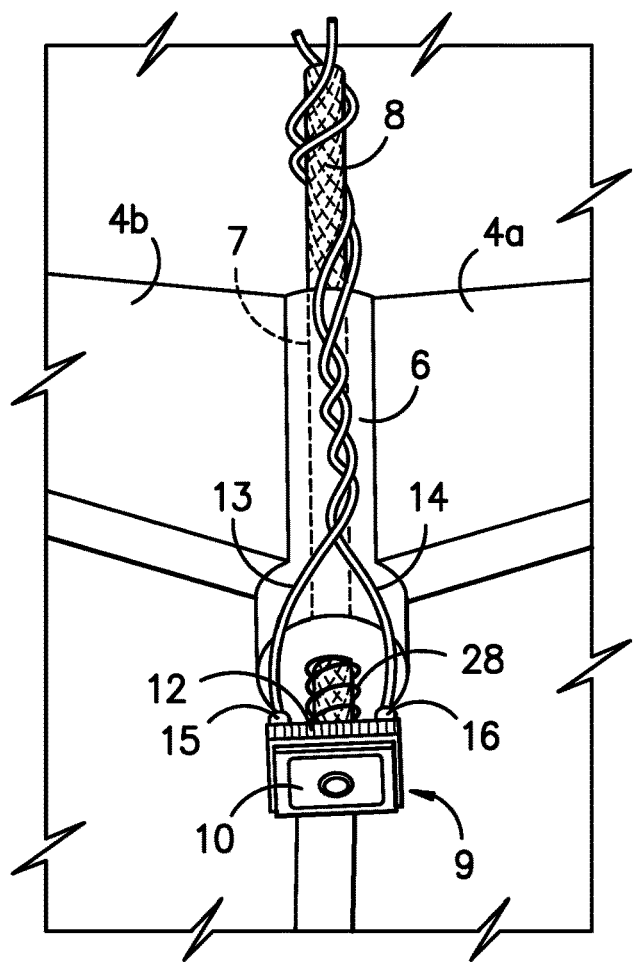
FIG. -4-

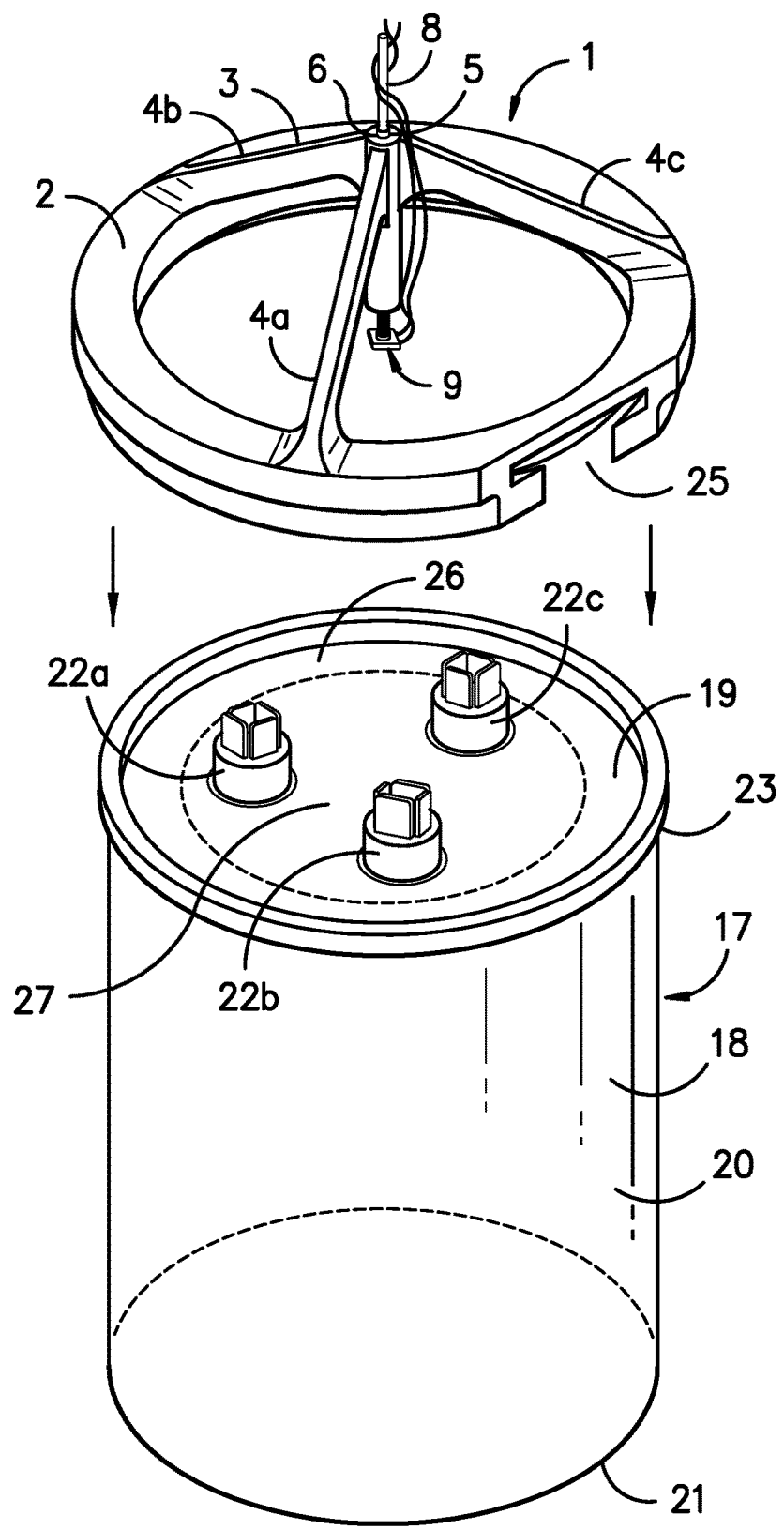
FIG. -5-

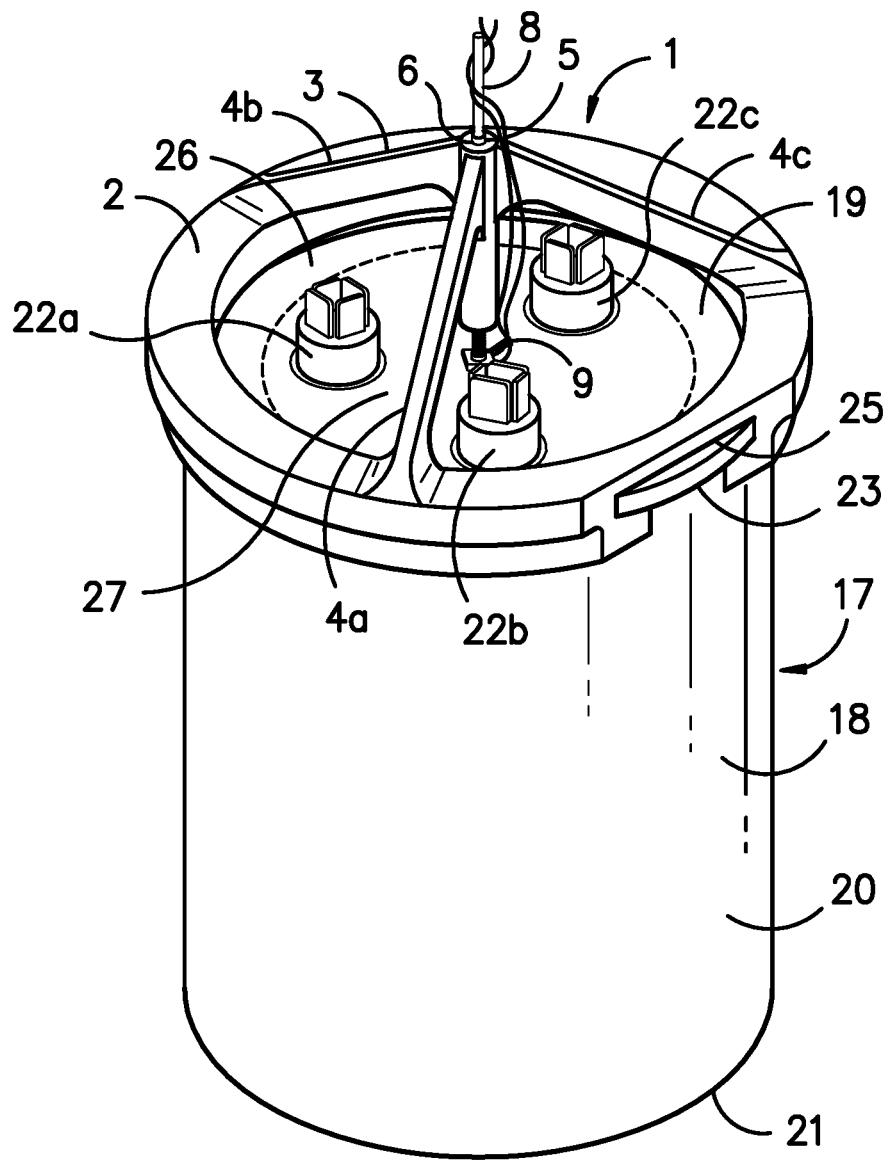
FIG. -6-

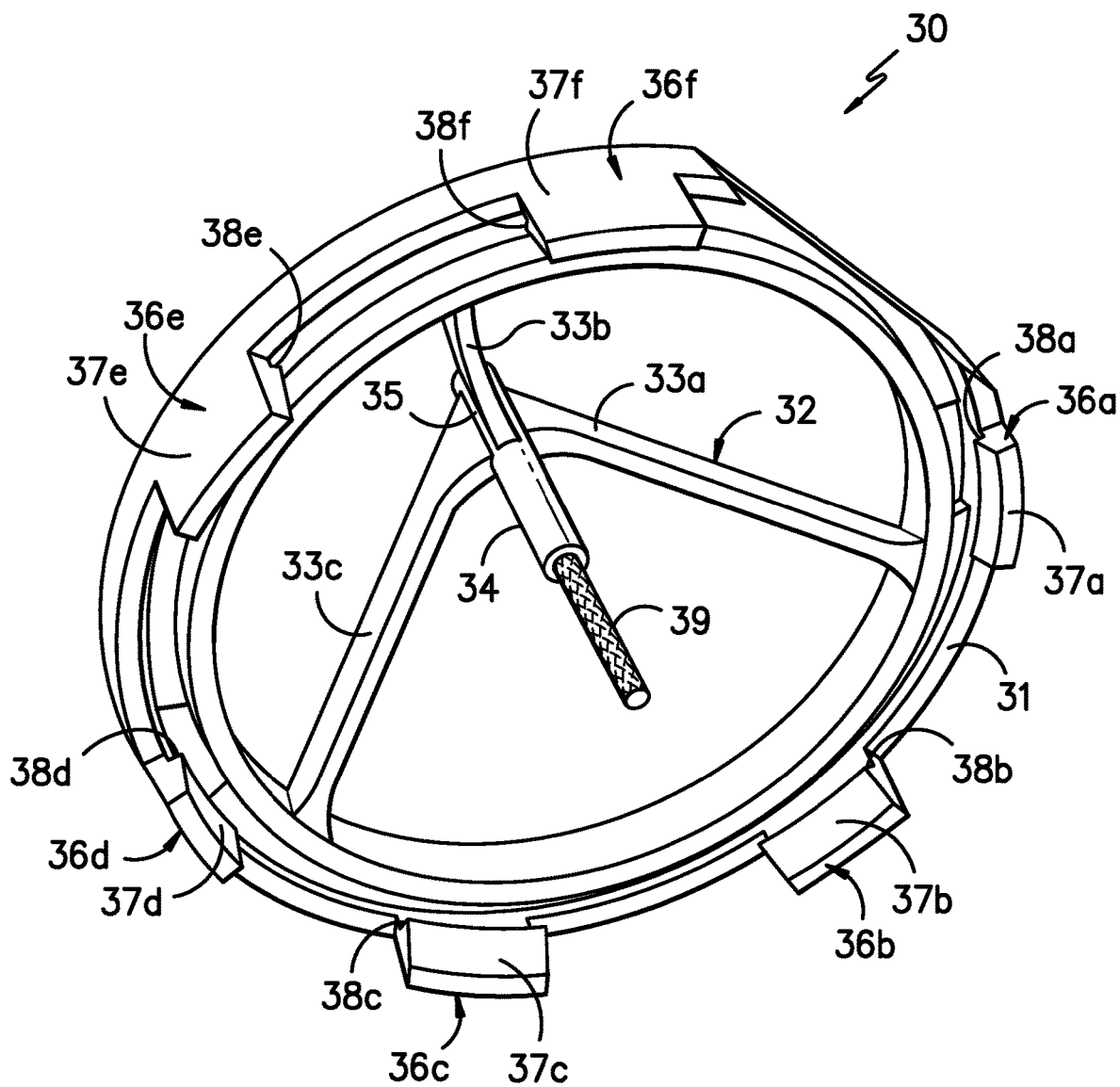
FIG. -7-

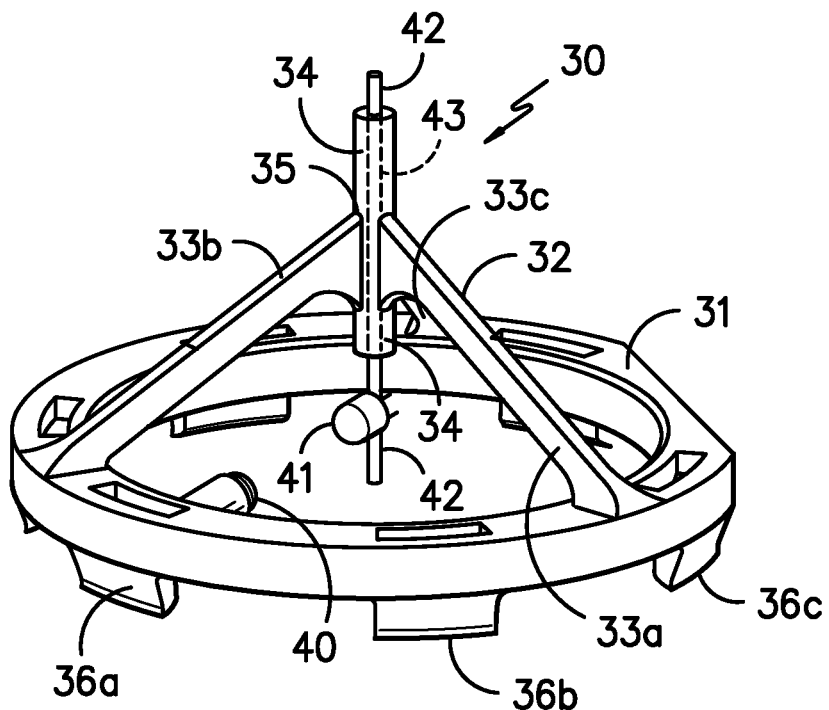
FIG. -8-
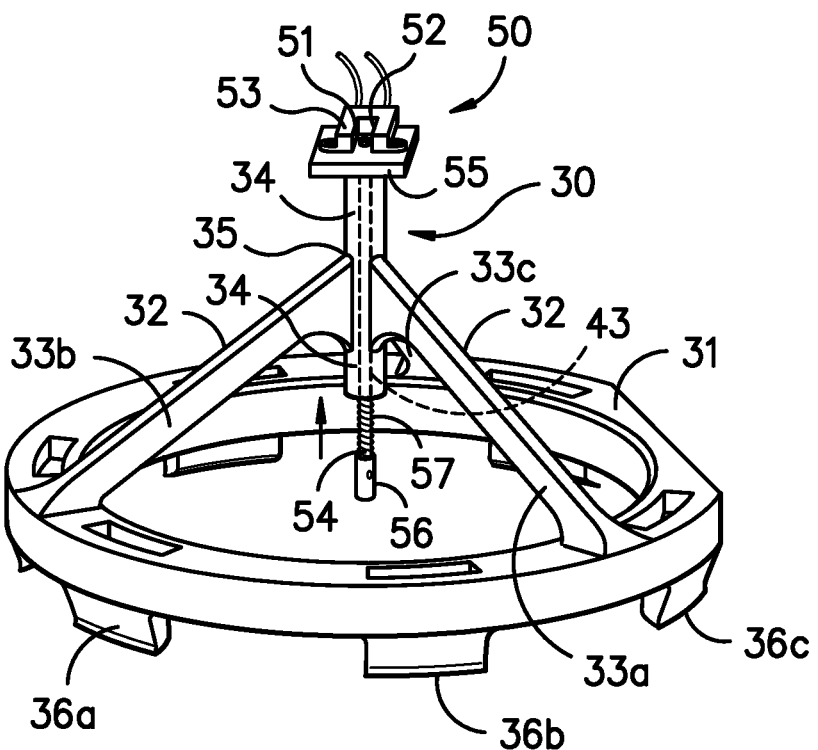
FIG. -9-

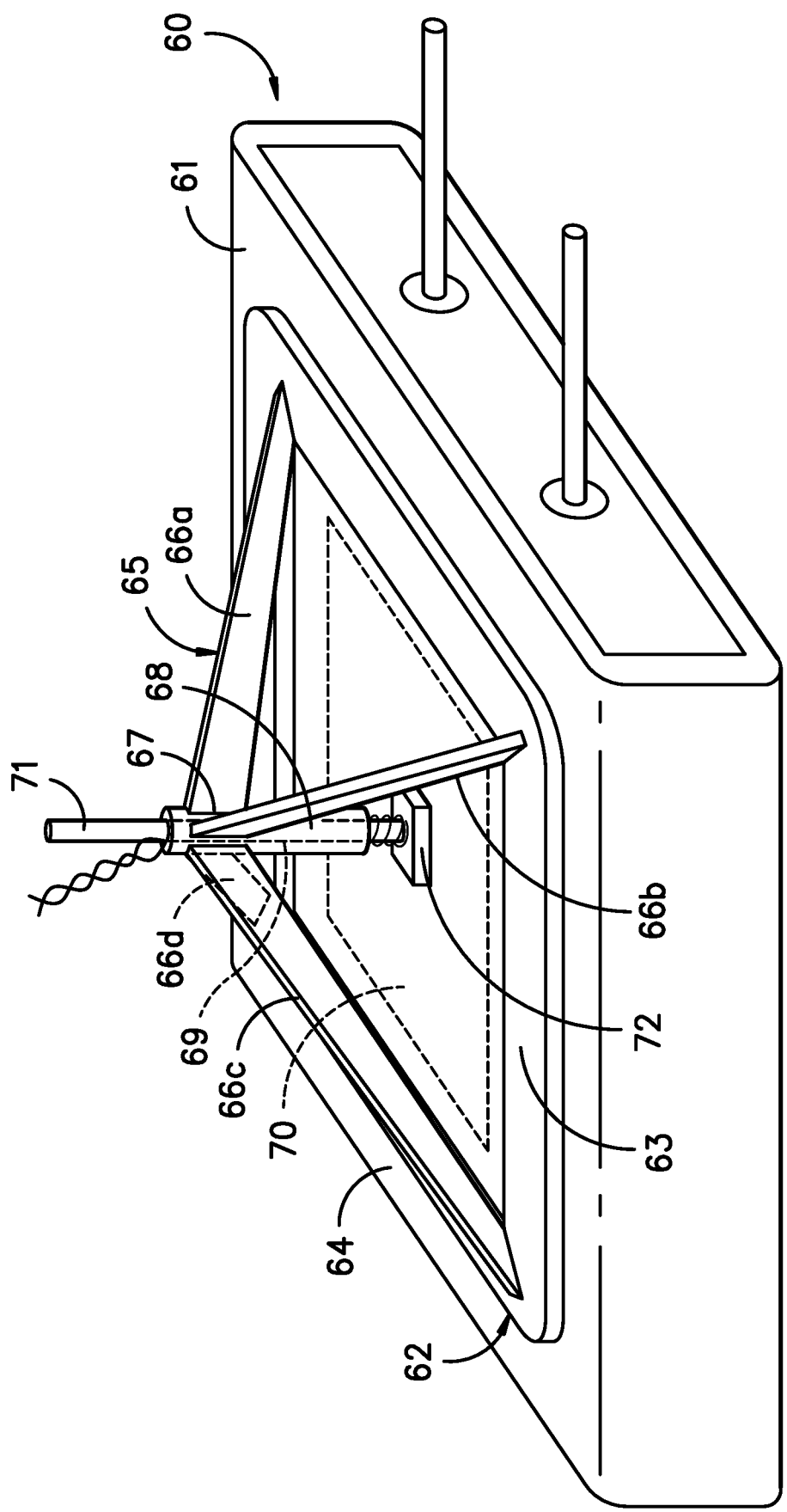
FIG. -10-

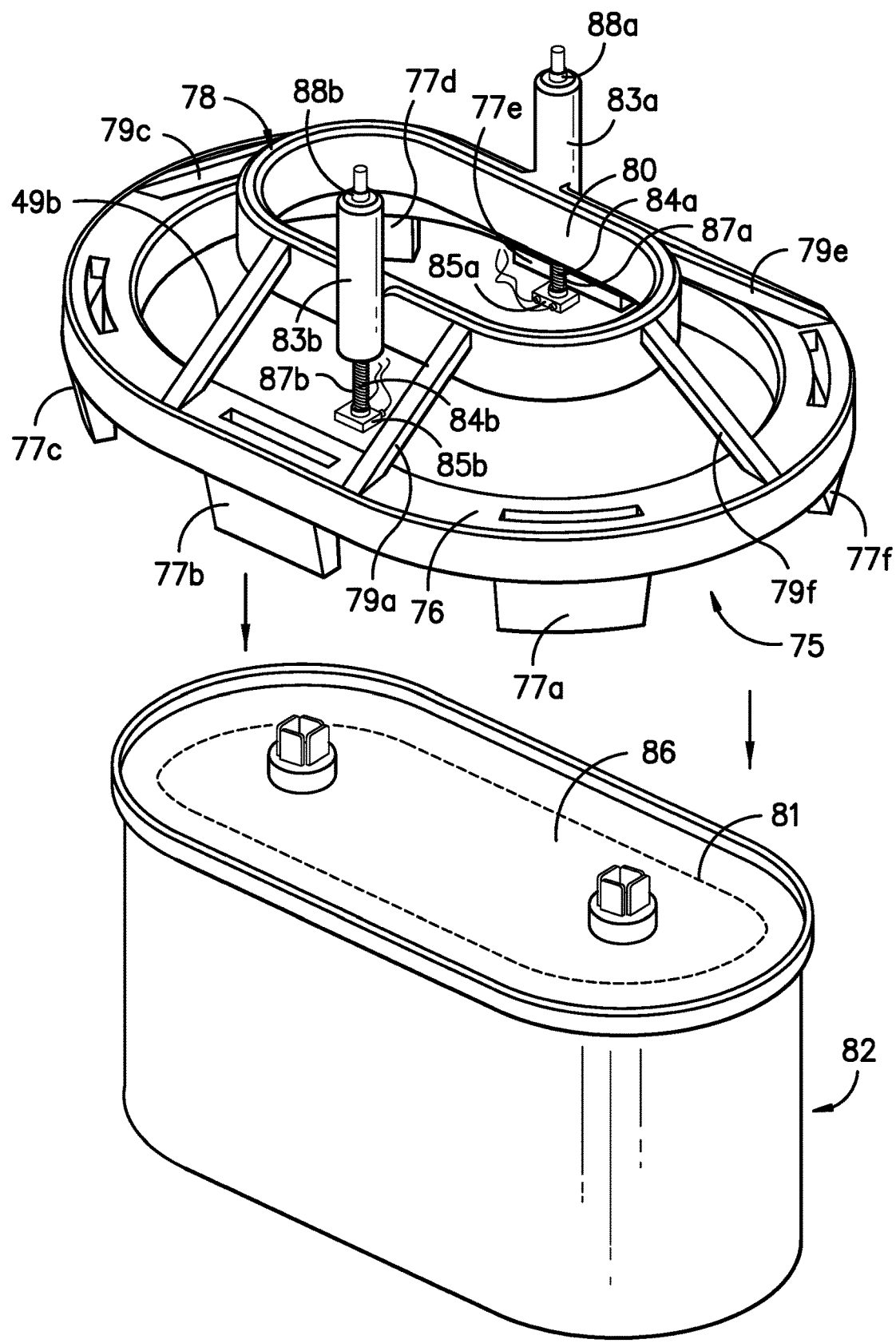
FIG. -11-

APPARATUS FOR DETECTING EXPANSION OF AN ENERGY STORAGE DEVICE CASE

The present invention is directed to an apparatus for detecting the expansion of a case housing an energy storage device, such as a capacitor or battery. The apparatus is mounted on the exterior of the case and generates a signal warning of a potential failure.

BACKGROUND OF THE INVENTION

Energy storage devices, such as capacitors and batteries, are typically housed in a sealed case. Terminals are located on the exterior of the case, for connecting the energy storage device to an electrical circuit. Over the lifetime of the device, the integrity of the components can decline, which may lead to the generation of gas pressure within the case and eventual failure. In addition to the loss of the component, the failure of the energy storage device can lead to rupture of the case and release of toxic and corrosive materials. Some energy storage devices, for example capacitors for use in HVAC equipment, lighting, AC filtering, line conditioning, power conversion, snubber circuits, DC link, pulse applications and high voltage applications, may be provided with a pressure interrupter, which breaks the connections between the device and the terminals, thereby disconnecting the device. When the pressure interrupter activates, however, the device is disconnected from service, without warning.

Prior to actual failure or activation of a pressure interrupter, the case of the energy storage device may begin to deform outward. Various methods and apparatus for detecting the onset of an outward expansion of the case have been disclosed in the prior art.

U.S. Pat. No. 4,869,197—Gupta et al. disclose a capacitor casing to which a frangible strip of material is attached. When the case deforms in response to a pressure buildup, the strip of material fractures, providing visual indication of the event.

U.S. Pat. No. 6,532,824 B1—Ueno et al. disclose a capacitive strain sensor that may be attached to the exterior surface of a hollow cylindrical container for detecting an increase in internal pressure.

U.S. Pat. No. 7,545,119 B1—Egan et al. disclose a piezoelectric sensor mounted on the exterior of the case of an energy storage device, to detect deformation caused by an increase in internal pressure. A voltage caused by deformation of the case wall is compared to a voltage threshold, and the device is shut down if the threshold is breached.

U.S. Pat. No. 7,595,128 B2—Lee et al. disclose a "seesaw member" attached to the outer surface of a battery, whereby swelling causes the seesaw member to exert downward force on a piezoelectric element. The electric current generated by the piezoelectric element is fed to a protection circuit module, which controls the operation of the battery.

U.S. Pat. No. 7,826,189 B1—Edwards discloses a detector for battery swelling. A conductive strip of material having an overlapping portion is attached to the exterior of a battery case. When the case deforms outward, the overlapping portion of the conductive strip decreases, thereby changing the resistance of the strip. The change in resistance is monitored, and the battery may be shut off if failure is determined to be imminent.

U.S. Pat. No. 8,717,186 B2—Zhou discloses a detector for swelling in batteries, incorporating a quantum tunneling composite based pressure-capacitor sensor. The signal generated by the sensor is fed to a microcontroller, and if the signal represents an increase in swelling above a threshold value, the unit is disconnected or replaced.

WO 91/15742—Shelton discloses a pressure sensing capacitor having two planar layers of conductive material separated by a narrow gap. One of the layers is able to flex in response to a change in pressure, thereby narrowing the gap and generating a change in capacitance value.

US Patent Application Publication US 2016/0064780 A1—Jarvis et al. discloses various methods for detecting and controlling battery expansion. The swelling of the battery case may be determined by a capacitive sensor, strain sensor, resistance sensor, acoustic resonance sensor, photo interrupter sensor, contact switch or pressure sensor. A signal indicating that expansion has occurred is sent to a processing unit, and the processing unit modifies the electrical input to the battery.

Despite the various prior art detectors, there remains a need for a device for detecting the expansion of a case housing an energy storage device, while the device continues to function, that is adaptable to a wide range of case designs, inexpensive, robust, and easy to install by an OEM or as an aftermarket add on.

SUMMARY OF THE INVENTION

The present invention is directed to an energy storage device housed in a case. The energy storage device may be a capacitor or a battery. Suitable capacitors include electrolytic capacitors, DC film capacitors, AC film capacitors and wet tantalum capacitors. Suitable batteries include non-rechargeable batteries and rechargeable batteries, such as lithium ion batteries, lithium polymer batteries, nickel-cadmium batteries, nickel-metal hydride batteries and lead-acid batteries.

The case has at least one side that expands outwardly in response to a buildup of internal pressure, which may be caused by a failure mechanism within the device. By way of example, the case housing the energy storage device may be cylindrical, that is, have a circular or oval cross-section taken perpendicular to the length of the cylinder, with caps at either end of the case. Or, the case may be selected from those having a rectangular prism shape or a pouch shape. In one embodiment of the invention, the case is cylindrical and at least one end has a rolled edge forming a lip.

The side of the case has a periphery, for example, where the side is attached to other parts of the case, such as the end caps of a cylindrical case to the curved, vertical surface, or where a substantially planar material forms an angle with another side of the case, such as a bend of 90° found in a case having a rectangular prism shape. The expandable side of the case also has an interior, that is, a space within the periphery, whereby the interior expands outward a greater distance than the periphery, in response to an increase in internal pressure within the case.

A detector support is provided with a base attached to the outside of the case, adjacent the periphery of the expandable side. By way of example, the base may be attached to the case by an adhesive or the base may engage the case to create a snap-fit connection. In one embodiment of the invention, the case has a cylindrical shape with an end having a rolled edge, and the base is shaped to create a snap-fit connection with the outside of the rolled edge.

The detector support is further provided with a superstructure extending upward from the base, above the interior of the expandable side of the case, for supporting a detector. The superstructure of the detector support may be formed with a single upright or arm, or a plurality of arms, for example, two, three, four or more arms, joined together to form a vertex or by a collar support. Openings between the arms allow terminals mounted on or formed in the case to be connected to wires, which in turn connect the energy storage device to an electrical circuit. In one embodiment of the invention, the superstructure is positioned above, but is not in contact with, the interior region of the expandable side of the case.

A detector is mounted on the detector support, with at least one component of the detector supported by the superstructure of the support and in proximity to the interior of the expandable side of the case, whereby expansion of the case will activate the detector. The term "detector" refers to a device capable of sensing the outward expansion of the case of an energy storage device and generating an electrical signal in response thereto. The term "activate" refers to an expansion of the case of an energy storage device that causes the detector to generate an expansion signal. An advantage of the present invention is that a wide variety of detectors may be employed in combination with the detector support.

In one embodiment of the invention, the detector is activated by contact with the interior region of the expandable side of the case. The detector may be in direct contact with the interior region, prior to expansion of the case due to internal pressure. Or, the detector may be within the range of expansion of the interior region, for example, within 0.5 mm to 3 mm, in particular from 1 mm to 2 mm, prior to expansion of the case due to internal pressure. By way of example, the detector may be a contact switch, strain gauge, capacitive sensor, resistance sensor, including a flexible resistor, galvanometer, voltage sensor, or piezoelectric sensor. In one example, the detector may be a contact switch that is activated by a pressure of 0.5 lbs. or less. The detector may incorporate an actuator that is displaced by expansion of the interior of the side of the case, causing the actuator to engage and activate the detector, thereby generating an expansion signal. By way of example, the actuator component of the detector may be a whisker for a whisker switch or the detector may be a photodetector in combination with (i) an actuator that is displaced to block a light signal, such as in a photo interrupter sensor, or (ii) either a phototransmitter or a photoreceiver component of a photodetector is mounted on an actuator, and when the actuator is displaced the signal is broken. In another example, the actuator is displaced relative to a fixed component of the detector by movement of the expandable side of the case, and the resistance of a current is increased or decreased as the distance between the actuator and the fixed component changes.

In another embodiment of the invention the detector is a proximity sensor, that is, the detector can be activated without making contact with the case, when it expands. By way of example, the detector may be a capacitive displacement sensor, photoelectric reflective sensor, acoustic resonance sensor or inductive sensor.

The detector may be energized by an external power source, such as the electric circuit to which the energy storage device is connected, a dedicated power source, such as its own battery, or by the energy storage device that the detector is monitoring. By way of example, the detector may be powered by a 12 volt or 24 volt energy source.

When the case of an energy storage device expands in response to an increase in internal pressure, the detector is activated and generates an electrical signal indicating that a buildup of pressure has occurred. The nature of the electrical signal and the requirements for processing the signal, for example, comparing one input to a set point or another input to evaluate expansion of the side of the case, depends on the nature of the detector. By way of example, if the detector is a switch, such as a contact switch or pressure switch or a photo sensor, an on or off signal indicates that an internal pressure buildup within the energy storage device has occurred. If the detector is a strain gauge, capacitance sensor or resistance sensor, for example, the signal from the detector may be sent to a microprocessor or equivalent circuitry for comparison to a set point or previous reading generated by the detector, to determine whether a failure of the energy storage device is imminent.

The electrical signal indicating that a buildup of internal pressure within the case of the energy storage device has occurred represents an output that can be transmitted and employed in various ways. The signal may be sent to a wireless transmitter and relayed to a wireless receiver, for example, via Wi-Fi protocol, and distributed within or without a network via the internet. The information can be sent directly to a technician's smartphone, for example as an email, text message, voice mail, or the like, providing specific information about the device that may be failing, such as the part number. The detection of a buildup of internal pressure may be used to shut off the device, control the flow of current to the device, alert an on-site operator of the risk of imminent failure via audible or visual signal, or document performance of the device. The foregoing options are not mutually exclusive and some may be carried out simultaneously or sequentially.

BRIEF DESCRIPTION OF DRAWINGS

FIG. 1 is an upper perspective view of the expansion detector and detector support.

FIG. 2 is an enlarged view of the central superstructure of the detector support and the detector of FIG. 1.

FIG. 3 is a lower perspective view of the expansion detector and detector support.

FIG. 4 is an enlarged view of the central superstructure of the detector support and the detector of FIG. 3.

FIG. 5 is an exploded view of the detector and detector support and a capacitor.

FIG. 6 is a top perspective view of the components of FIG. 5 assembled.

FIG. 7 is lower perspective view of the detector support showing a snap-fit configuration.

FIG. 8 is an upper perspective view of the detector support and photodetector combination, with a component of the detector mounted on a displaceable post.

FIG. 9 is an upper perspective view of the detector support and photodetector combination, whereby displacement of the post interrupts the beam.

FIG. 10 is an upper perspective view of the detector support and detector mounted on a side of a rectangular prism shaped energy storage device.

FIG. 11 is an upper perspective view of the detector support and two detectors, configured to fit an energy storage device having an oval cross-section.

DETAILED DESCRIPTION OF THE INVENTION

Without intending to limit the scope of the invention, the preferred embodiments and features are hereinafter set forth. All of United States patents and published applications cited in the specification are incorporated herein by reference. Unless otherwise indicated, conditions are 25° C., 1 atmosphere of pressure, and 50% relative humidity. The term "polymer" or "polymeric" as used in the present application denotes a material having a weight average molecular weight ($M_w$) of at least 5,000.

Referring to FIGS. 1-6, a detector and detector support of the present invention are shown in combination with an energy storage device having a round, cylindrical case. Detector support 1 has base 2, for engaging the case of an energy storage device and superstructure 3, for supporting an expansion detector. Superstructure 3 has arms 4a, 4b and 4c, spaced approximately 120° apart around base 2. Arms 4a-4c angle upward from base 2 and are joined together at vertex 5 to support tube 6. Arms 4a-4c may be angled upward from base 2, for example, at an angle of 30° to 60°. Channel 7 extends through tube 6, and post 8 is inserted in channel 7, and is slidable relative to tube 6.

It can be understood that the superstructure of the detector support may have only a single arm, bar or arch extending from one side of the base to the other, or two arms extending upward and joined in the center to form a vertex, or even four or more arms. Furthermore, the elements forming the superstructure need not be evenly spaced around the base, but rather can be positioned to provide opening between support elements of different sizes.

Detector 9 may be mounted at the lower end of post 8. Referring to FIG. 4, detector 9 includes tactile switch 10 and mounted on printed circuit board ("PCB") 12. Wires 13 and 14 extend from leads 15 and 16 of PCB 12, respectively. Wires 13 and 14 may be electrically connected to a microprocessor and a wireless transmitter capable of sending information regarding the status of the energy storing device to a receiver, which in turn may be connected to an internal or external network, the internet, or smart phone, or the wires may be directly connected to a device capable of shutting off the device, controlling the flow of current to the device, alerting an operator of the risk of imminent failure, or documenting performance of the device, as is known to those skilled in the art.

Referring to FIGS. 5 and 6, the detector support 1 and detector 9 are mounted on capacitor 17. Case 18 of capacitor 17 has top side 19, curved, vertical side 20 and bottom side 21. Terminals 22a, 22b and 22c are mounted on top side 19 and extend upward for connecting capacitor 17 to an electrical circuit (not shown). Top side 19 and curved, vertical side 20 of case 18 are sealed together by creating a rolled edge at the periphery of top side 19, as is known in the art, which extends outward to form lip 23.

Referring to FIG. 3, base 2 incorporates concentric ridge 24, which extends inward. Concentric ridge 24 functions as an annular lock feature, and lip 23 of capacitor 17 functions as a mating part, which together create a snap-fit connection. Base 2 may be provided with cutout 25, to reduce the force required to fit base 2 over lip 23, which allows greater latitude in selection of material for detector support 1, such as polymers with a relatively high Young's modulus. By way of example, the detector support may be an injection molded part made of the following polymers or combinations thereof: polyamides, including nylons and aramids, polyesters, including PET, polyolefins, including polypropylene, polyethylene and copolymers of ethylene and propylene, polyurethanes, polyvinyl chloride (PVC), or acrylonitrile butadiene styrene (ABS).

Referring to FIGS. 5 and 6, detector support 1 is mounted on case 18, with base 2 adjacent the periphery 26 of top side 19, in particular with base 2 engaging lip 23 of case 18. Detector 9 is in proximity to interior 27 of top side 19, that is, detector 9 is in contact with top side 19, or sufficiently close to top side 19 that outward expansion of top side 19 in response to an increase in internal pressure within case 18 either causes top side 19 to contact detector 9, or creates a significant change in the parameter being sensed by the detector, such as change in capacitance or resistance. In order to position detector 9 at the desired height, in proximity to the interior of top side 19, the position of post 8 in channel 7 of tube 6 can be adjusted up or down. In one embodiment of the invention, channel 7 and post 8 are threaded and post 8 can be adjusted up or down with a screwdriver. Alternatively, post 8 may be adjusted to provide the desired position of detector 9, and post 8 can be riveted or fastened with a locking structure, such as a snap ring or crimp ferrule. If detector 9 is to be positioned without being in contact with top side 19, then a feeler gauge may be used to set the distance.

The invention is illustrated in combination with a capacitor having three terminals mounted on the top side. The detector support and detector may be mounted on a capacitor having from one to seven, or even more than seven terminals, mounted on the top side or cover of the capacitor. By way of example, the capacitor may be a multi-capacitor, that is, have multiple capacitor elements within the case, which can be connected in parallel or series in various combinations, such as those disclosed in U.S. Pat. No. 7,423,961 B2 and U.S. Pat. No. 9,466,429 B1. It can be noted that if an energy storage device has a terminal in the center of the side to which the detector support is attached, the detector may be mounted on the superstructure off-center. Furthermore, it can be noted that the detector support and detector may operate in conjunction with an energy storage device having a pressure interrupter mechanism, including a mechanism that relies upon expansion of the cover to break the connection between the terminals and the elements within the device, as illustrated in the aforementioned patent references.

Thus, in one embodiment of the invention, the detector support and detector are mounted above the cover of a capacitor case, as illustrated in FIGS. 5 and 6, wherein the cover is a functional component of a pressure interrupter mechanism, that is, the cover expands outward to break an electrical connection to the terminals mounted on the cover, in case of a failure. Safety regulations may require that the capacitor cover, shown as top side 19 in FIGS. 5 and 6, be allowed to expand unimpeded at least ½ inch or greater, to allow the pressure interrupter to operate.

Referring to FIGS. 1-6, detector support 1 is provided with spring 28 or comparable resilient member, such as a compressible elastic sleeve, positioned between the lower end of tube 6 and the bottom end of post 8. Spring 28 is capable of maintaining detector 9 in the desired position relative to top side 19 of case 18, for operation of the detector, that is, sufficient resistance is provided for the detector to be activated by the force of the outward expansion of the case. When enough force is generated by outward expansion of top side 19 of case 18 to overcome the resistance of spring 28, spring 28 is compressed and post 8 and detector 9 are forced upward towards the lower end of tube 6. The optimum distance between detector 9 and the interior 27 of top side 19 will vary depending upon the type of detector employed. For example, tactile sensors, such a contact switch, may be positioned a small distance from the expandable side of the case of the energy device, to avoid insignificant movements of the case from triggering false alarms. A feeler gauge can be inserted between the bottom of the detector and the side of the case to set the desired distance and the downward travel of post 8 can be restrained, such as by crimp ferrule 29 applied to post 8, adjacent an upper side of tube 6. Alternatively, post 8 can be restrained by a snap ring or pin extending perpendicularly through the post. An advantage of employing a spring to urge the bottom of post 8 away from vertex 5 is that the detector support and detector can be placed on an energy storage device in any orientation, for example, with post 8 aligned horizontally, without having to rely on gravity to maintain the position of the detector.

Referring to FIG. 7, a detector support with an alternative snap-fit connection is illustrated. Detector support 30 has base 31 and superstructure 32 formed of arms 33a, 33b and 33c. Superstructure 32 has tube 34 supported at vertex 35. A detector (not shown) may be mounted on superstructure 32, as disclosed herein. For example, a detector may be mounted on the bottom end of post 39, as shown in FIGS. 1-4, with regard to detector support 1.

Base 31 of detector support 30 is provided with a plurality of locking mechanisms 36a, 36b, 36c, 36d, 36e and 36f, for engaging an energy storage device, such as capacitor 17 shown in FIG. 5. Each of the locking mechanisms 36a-36f is comprised of a tab 37a-37f, respectively, which functions as a cantilever beam to deflect and engage the case of an energy storage device and also functions to locate and align base 31, and a catch 38a-38f, respectively, which locks base 31 to a mating part of the energy storage device, such as lip 23 on the periphery of top side 19 of capacitor 17.

The detector support shown in FIG. 7 is designed to engage an energy storage device having a rolled edge or lip that protrudes outward from the periphery of the side of the case. Alternatively, the rolled edge may extend inward, from the periphery, and the locking feature of the detector support may be turned outward, to engage the rolled edge, with the tabs positioned on the inside of the lip, rather than on the outside of the lip.

FIG. 8 shows a photodetector mounted on the detector support of FIG. 7. Transmitter 40 is mounted on base 31 and receiver 41 is mounted on post 42, which is able to travel up and down in channel 43 within tube 34. In response to an expansion of a side of an energy storage device, post 42 and receiver 41 are displaced upward, thereby breaking the beam of light. By way of example, transmitter 40 may be an IR LED transmitter and receiver 41 may be an IR LED receiver. The relative positions of the transmitter and receiver may be reversed, that is, the transmitter may be mounted on the post and the receiver mounted on the base of the detector support.

FIG. 9 shows an alternative design of a photodetector mounted on the detector support of FIG. 7 in which actuator 54 moves upward to break the beam of light between a transmitter and receiver. Phototransistor 50 is mounted on platform 55 the top of tube 34 of detector support 30. Phototransistor 50 has optical transmitter 51 and optical receiver 52 mounted within case 53. Actuator 54 is able to move up and down within channel 43 of tube 34. When actuator 54 is displaced upward in response to an expansion of a side of the energy storage device, actuator 54 interrupts the beam of light, thereby triggering a signal that a potential failure of the energy storage device is imminent. Actuator 54 has sleeve 56, which can be adjusted up or down over the threaded portion of actuator 54. Spring 57 is interposed between the bottom of tube 34 and the top of sleeve 56 to maintain actuator 54 in the desired position relative to the interior of the expandable side of an energy storage device. It can be understood that the resistance provided by spring 57 is not intended to impede the displacement of actuator 54, when the case expands.

FIG. 10 illustrates the detector of the present invention in combination with an energy storage device having a rect-angular prism shape. The energy storage device is capacitor 60, which has flat side 61. Detector support 62 has base 63 attached adjacent to periphery 64 of side 61. Base 63 may be attached to side 61, which may be a metal or synthetic polymer material, with a suitable adhesive. The term "adhesive" is intended to include glue, cement and paste, and the adhesive may be reactive or non-reactive. Superstructure 65 of detector support has four arms, 66a, 66b, 66c and 66d, which join at vertex 67 and support tube 68. Channel 69 is a hollow core extending through tube 68. An expansion detector may be mounted on superstructure 65, whereby the detector is positioned in proximity to interior 70 of side 61. For example, a detector may include post 71 positioned in channel 69, which is able to slide relative to tube 68. In the event of an expansion of side 61 of capacitor 60 caused by an increase in internal pressure, interior 70 expands outward a significantly greater distance than periphery 64 where base 63 is attached, thereby activating detector 72.

Referring to FIG. 11, an embodiment of the invention designed to engage an energy storage device having an oval cross-section is illustrated. Detector support 75 has base 76 with tabs 77a, 77b, 77c, 77d, 77e and 77f, extending downward and capable of engaging the lip of a cylindrical capacitor case having an oval cross-section. The design and function of tabs 77a-f are analogous to tabs 37a-f of detector support 30 shown in FIG. 7. Superstructure 78 extends upward from base 76 and has arms 79a, 79b, 79c, 79d, 79e and 79f, which are joined together by collar 80.

The cover 81 of the case for oval shaped capacitor 82 may expand asymmetrically in response to internal pressure. Accordingly, two or more detectors may be mounted on detector support 75. And either detector may be relied on to signal expansion of the cover 81. Tube 83a is attached to collar 80. Post 84a is slidable within tube 83a. Detector 85a is mounted on the lower end of post 84 and overlays the interior section 86 of cover 81 of capacitor 82. Spring 87a creates a downward force on post 84a and detector 85a. The downward movement of post 84a is stopped by crimp ferrule 88a.

The other detector mounted on superstructure 78 may perform identically to the above described mechanism. In particular, tube 83b, post 84b, detector 85b, spring 87b, and crimp ferrule 88b, have the same structure and function as described with regard to tube 83a, post 84a, detector 85a, spring 87a, and crimp ferrule 88a. Wires connected to detector 85a and 85b may be employed to transmit an electrical signal, as described herein with regard to the device shown in FIGS. 1-6. Alternatively, two different types of detectors may be employed, which provides an additional safeguard.

The invention has been illustrated with a detector support having a continuous base, whereas the base may be discontinuous. For example, the base may be comprised of discrete "feet" that are provided at the end of the arms forming the superstructure.

There are, of course, many alternative embodiments and modifications of the invention intended to be included in the following claims.

What we claim is:

1. A multicapacitor having a case with a cover, wherein the cover expands in response to a buildup of pressure within the case, a plurality of capacitor elements within the case, a plurality of terminals mounted on the cover and electrically connected to the capacitor elements, and a pressure interrupter positioned within a case and in communication with the cover, whereby outward expansion of the cover in response to pressure within the case can break the electrical connection between the capacitor elements and the terminals within the case, the improvement comprising:
(a) a detector support having a base attached to an outside of the case adjacent a periphery of the covet, the support further having a superstructure extending from the base above an interior of the cover of the case; and
(b) a detector mounted on the superstructure of the support in proximity to the interior of the cover of the case, whereby the detector is activated and generates an expansion signal when the cover expands in response to an increase in internal pressure within the case.

2. The multicapacitor of claim 1, wherein the detector is activated and generates an expansion signal prior to the pressure interrupter breaking the electrical connection between the capacitor elements and the terminals within the case.

3. The multicapacitor of claim 1, wherein the terminals can be connected to an external electrical device by wires extending through the superstructure of the detector support.

4. The multicapacitor of claim 1, wherein the detector is a contact switch.

5. An energy storage device, comprising:
(a) a capacitor having a case with an expandable cover, whereby the cover expands outward in response to an increase in internal pressure within the case, the cover having a periphery and an interior, wherein the interior expands outward a greater distance than the periphery in response to the increase in internal pressure, the cover having at least one terminal mounted thereon, the capacitor further comprising a capacitor element and a pressure interrupter within the case, wherein the pressure interrupter is in communication with the cover, and wherein expansion of the cover can break an electrical connection between the terminal and the capacitor element within the capacitor case;
(b) a detector support having a base attached to an outside of the case adjacent the periphery of the cover, the support further having a superstructure extending from the base above the interior of the cover of the case; and
(c) a detector mounted on the superstructure of the support in proximity to the interior of the cover of the case, whereby the detector is activated and generates an expansion signal when the cover expands in response to an increase in internal pressure within the case, while the energy storage device continues to function.

6. The device of claim 5, wherein the case is cylindrical and has a round or oval cross-section and the cover is an end of the cylindrical case.

7. The device of claim 5, wherein the case has a peripheral lip around the cover, and the base of the detector support engages the lip with a snap fit connection.

8. The device of claim 5, wherein the superstructure comprises a plurality of arms extending upward from the base and the arms are joined together at an opposite end from the base.

9. The device of claim 5, wherein the case of the energy storage device has a rectangular prism shape, and the base is mounted on the case with an adhesive.

10. The device of claim 5, wherein the detector is in contact with the interior of the cover of the case when the detector is activated.

11. The device of claim 10, wherein the detector is a contact switch.

12. The device of claim 5, wherein the detector is selected from the group consisting of a contact switch, strain gauge, capacitive sensor, resistance sensor and photo sensor.

13. The device of claim 5, further comprising a microprocessor electrically connected to the detector, whereby the microprocessor receives the electrical signal generated by the detector and sends an expansion signal to a wireless transmitter.

14. The device of claim 5, wherein the capacitor is a multi-capacitor, and the cover has a plurality of terminals mounted thereon.

15. The device of claim 5, wherein the cover of the case has a plurality of terminals mounted thereon, and the terminals can be connected to an external electrical device by wires extending through the superstructure of the detector support.

16. The device of claim 5, further comprising a wireless signal generator electrically connected to the detector, whereby engaging the detector activates the signal generator.

17. The device of claim 5, wherein the energy storage device is a rechargeable battery.

18. The device of claim 5, further comprising a second detector mounted on the superstructure of the detector support in proximity to the interior of the cover of the case, whereby the second detector is activated and generates an expansion signal when the cover expands in response to an increase in internal pressure within the case.

19. The device of claim 18, wherein the case is cylindrical and has a round or oval cross-section and the cover is an end of the cylindrical case.

20. The device of claim 15, wherein the superstructure comprises a plurality of arms extending upward from the base and the arms are joined together at an opposite end from the base.

* * * * *